Aug. 10, 1965 R. M. STUART 3,200,366
REUSABLE PERIPHERAL SEAL JOINT
Filed July 17, 1963
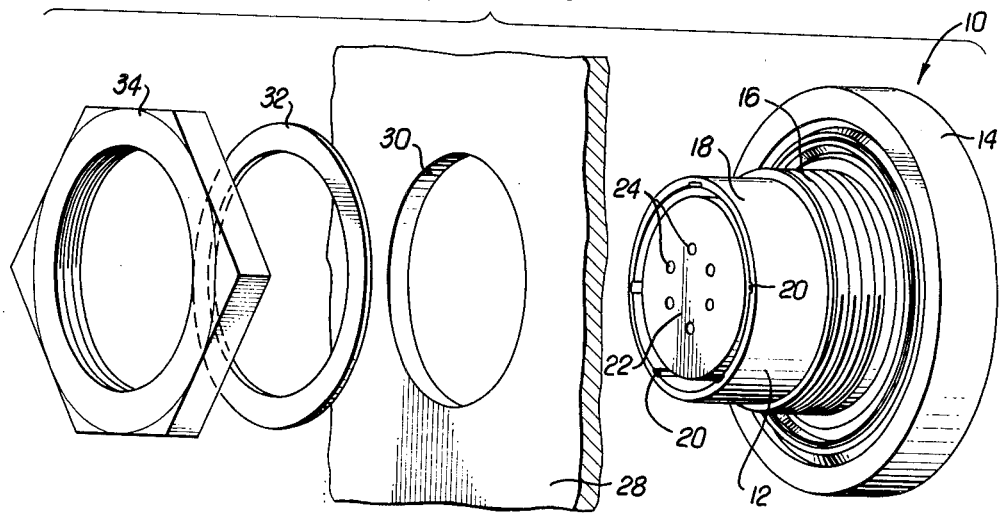
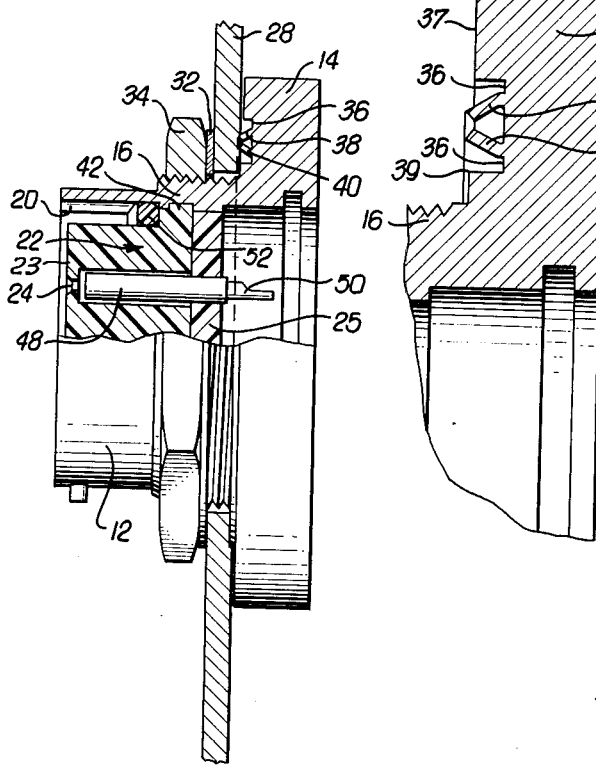
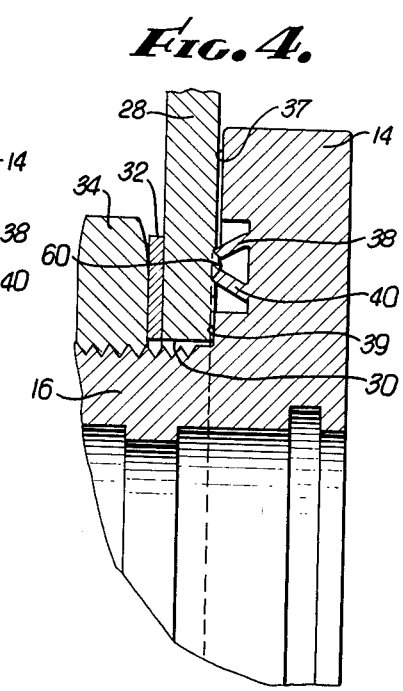
INVENTOR.
ROSS M. STUART
BY
Huebner & Worrel
ATTORNEYS.

United States Patent Office 3,200,366
Patented Aug. 10, 1965

3,200,366
REUSABLE PERIPHERAL SEAL JOINT
Ross M. Stuart, Tempe, Ariz., assignor to International Telephone and Telegraph Corporation, New York, N.Y., a corporation of Maryland
Filed July 17, 1963, Ser. No. 295,653
14 Claims. (Cl. 339—130)

The present invention relates to sealed joints, especially as applied to electrical connector members of the type having one or more contact terminals in one connector member which are mateable with one or more corresponding contact terminals in another connector member when the connector members are interengaged, and the invention relates more particularly to such a sealed joint which is gas tight.

The sealed joint of the present invention is especially intended to be used in an environment which requires a gas tight metal to metal seal. For example, an electrical connector member joined to a bulkhead or wall must form a gas tight seal in order to prevent leakage through the joint when a pressure differential exists across the bulkhead or wall. Thus an electrical connector member of the type contemplated may be used in a pressure vessel which requires an electrical connection with the outside, and prevents loss of pressure from the vessel while establishing the necessary electrical connections.

When a pressure vessel, for example, is tapped and an electrical connector member inserted therein and attached to the wall so tapped, leakage of gas can occur in two ways. Gas leakage may occur through the connector member itself. Such leakage is easily and effectively controlled by sealing means known within the art. Leakage may also occur at the joinder of the electrical connector member to the wall of the vessel so tapped and this source of leakage is more difficult to control. Gaskets have been used in the past to control gas leakage but the effectiveness of such a joint is not adequate for all applications.

It is therefore an object of this invention to provide a gas tight joint.

Another object of this invention is to provide a metal to metal gas tight joint.

It is still another object of this invention to provide an electrical connector member which is attachable to a wall and embodies novel sealing means to form a gas tight seal therewith.

Yet another object of this invention is to provide a sealed joint between members wherein the metal of one of the members is in effect a gasket material.

A preferred embodiment of this invention may be generally described as an electrical connector member which is adapted for use with a mating connector structure for attachment to a wall. The electrical connector member is comprised of a shell member having an annular flange surrounding the shell member and a threaded portion. The face of this annular flange which is nearest to the threaded portion has a pair of concentric annular lips projecting therefrom. These lips are inclined toward each other so that their forward extremities are closer together than their bases. When the threaded portion of the electrical connector is inserted through a hole in a wall it can be attached to this wall by screwing a nut onto the projecting threaded portion. This draws the face of the flange against the opposite side of the wall. When the forward extremities of the lips on the flange are pressed against the wall they will tend to be deflected toward each other and to press into the surface of the wall. Since the lips are relatively close together they will pinch the wall surface between them thereby providing the gas-tight sealed joint which is the primary objective of this invention.

Further objects and advantages of the present invention will appear during the course of the following part of this specification wherein the details of construction and mode of operation of a preferred embodiment are described with reference to the accompanying drawing in which like numerals indicate the like parts in all the figures and in which:

FIGURE 1 is a perspective exploded view of the parts of the present invention showing the electrical connector member, the bulkhead or wall to which attached, and the mode of attaching;

FIGURE 2 is an axial vertical section, partly in elevation, showing the internal construction of an electrical connector member according to the present invention which is shown attached to a bulkhead or wall;

FIGURE 3 is an enlarged axial sectional view of a portion of the electrical connector member of FIGURE 2, disclosing details of the seal when the member is unattached;

FIGURE 4 is an enlarged axial sectional view showing a portion of the electrical connector member of FIGURE 2, but connected to the bulkhead or wall intended, and showing the details of attachment.

Referring at first to FIGURE 1 of the drawings, there is shown electrical connector member 10 including hollow connector shell 12 having an external flange 14, an externally threaded portion 16, and a forward skirt portion 18 for mating with an opposed connector member. The skirt portion 18 is provided with an axially arranged, internal polarizing groove 20. Positioned inside the connector shell 12 is insulation body 22 having bores 24 within which contact terminals are mounted. Bulkhead or wall 28 is provided with orifice 30 which is suitable for the insertion of the skirt portion 18 and at least a part of the threaded portion 16 of the electrical connector member 12. Compression ring 32 is provided for use in conjunction with nut 34 which is threadable upon the threaded portion 16 of connector shell 12 when the parts are brought together into their mated or engaging relationship.

FIGURE 2 shows the nut 34 engaging the threaded portion 16 of the connector shell in conjunction with compression ring 32, with the nut 34 and flange 14 on opposite sides of bulkhead 28 so as to hold the electrical connector shell 12 to bulkhead 28. The face of the flange 14 nearest bulkhead 28 has an annular depression 36 and annular lips 38 and 40, preferably concentric, project from the bottom of said annular depression and contact bulkhead 28 to provide sealed engagement therewith as hereinafter described in detail.

The inner construction of the electrical connector member is best shown in FIGURE 2, and includes the insulator body 22 having a forward mounting portion 23 and a rearward sealing or grommet portion 25, and being suitably positioned inside connector shell 12. Bores 24 extend through insulation body 22 for receiving respective contact terminals 48, which for illustration only, are socket contact terminals. Terminals 48 are supported in the forward mounting portion 23 and sealed in the grommet portion 25. Each socket contact terminal has a forward contacting portion adapted for mating with opposed contacts in another connector member, and has rearward termination means 50 for attaching to an electrical conductor. O-ring 52 is positioned between the internal surface of shell 12 and the insulation body 22 and provides a gas tight seal with a mating electrical connector member which is interengageable with the electrical connector member 10 attached to the wall or bulkhead 28. It will be seen that grommet portion 25 of insulation body 22 and O-ring 52 cooperate to provide an effective gas tight seal internally of the connector member.

FIGURE 3 shows the detail of the sealing lips 38 and 40 which are inclined towards each other and which project from the bottom of the annular depression 36 in the face of the flange 14 which abuts the wall or bulkhead to which joinder is intended. This abutting face of flange 14 presents an inner annular shoulder portion 39 radially inwardly of the lips 38 and 40, and an outer annular shoulder portion 37 radially outwardly of lips 38 and 40. Portions of lips 38 and 40 project above the shoulders 37 and 39, and one or both of the shoulders 37 and 39 limit the amount of advance of lips 38 and 40 toward the bulkhead or wall 28 and toward each other in the manner hereinafter described.

FIGURE 4 shows the mating or interengaging relationship of the parts, showing nut 34 in conjunction with compression ring 32 holding flange 14 tight against the face of bulkhead or wall 28, with lips 38 and 40 penetrating said face of wall 28 and causing portion 60 thereof to be pinched between them so as to form the seal.

When flange 14 is brought into contact with bulkhead or wall 28, inclined lips 38 and 40 are pushed together as the two parts are drawn together. This results in a tendency to pinch material from the face of bulkhead 28 between the two lips as they are pushed closer together. The sealing lips are preferably made of resilient material and are elastically deflected towards each other when the bulkhead and the flange are brought together with sufficient force, thereby increasing the angle subtended between the two lips and diminishing the space between the edges thereof. This elastic deformation assists in the present seal and is governed by the angle subtended initially between the lips and by the material from which the sealing lips are formed. If the lips are deflected beyond their elastic limits the effectiveness of the seal is diminished, and the sealing lips cannot be used again until suitably straightened; for this reason, the face of the flange acts as a stop, limiting the amount of movement of the lips toward the bulkhead or wall to prevent exceeding the elastic limits of the lips. In practice, any spacer or stop means may be employed to limit such movement. However in the form of the invention illustrated, one or both of the shoulders 37 and 39 of the flange perform this function.

The seal is obtained between the peripheries of the sealing lips and the face of the bulkhead by the action of the sealing lip peripheries or edges impinging upon the bulkhead face and by the physical interaction of the edges of the sealing lips against the bulkhead causing plastic deformation of either the bulkhead or the sealing lip edges or both. Thus the sharper the edges of the sealing lips and the softer the face of the bulkhead with respect to the sealing lips, the greater will be the tendency for the lips to bite into and plastically deform or extrude the bulkhead material into the gap between the lips. As the deflection of the two lips is increased, the mechanical advantage to further pinch or bite into the bulkhead material is also increased, increasing the effectiveness of the seal.

The angular relationship of the sealing lips to each other before nut 34 is tightened down to form the seal is a matter of choice. Applicant prefers however that the two lips subtend such an angle of at least 60° and not more than 120°, as such has been found useful in most applications.

The sealing lips may be fabricated and supported on a base or flange in any desired manner. For example, the sealing lips may be machined in coaxial cylindrical form from a unitary base or flange and then suitably bent to the desired angle. The lips may then be hardened if desired. More than one set of lips may be incorporated between the two members to be joined, but would not normally be necessary due to the effectiveness of the seal obtained from one set of lips.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What I claim as new and desire to secure by Letters Patent is:

1. A joint member for attaching to another member to form a sealed joint which comprises a pair of concentric annular lips projecting from a surface of said joint member, each lip having a forward extremity, the lips being inclined towards each other so that their forward extremities are closer together than their bases; means for attaching the two members to be joined and for forcing the two members together so as to deflect the lips closer together by abutting contact of the forward extremities of said lips of the joint member against the other member, said forward lip extremities being close enough together when deflected to be able to pinch the abutted surface of the other member between them so as to form a seal between the joint member and the other member; and said joint member including stop means for limiting movement of the lips toward said other member and towards each other as the two members are forced together.

2. The joint member of claim 1 in which the annular lips are resilient.

3. The joint member of claim 2 in which the lips are inclined towards each other so as to subtend an angle between them of from sixty to one hundred twenty degrees.

4. The joint member of claim 1 in which said stop means comprises an annular shoulder disposed adjacent to said lips.

5. A joint member for attaching to another member to form a sealed joint which comprises a pair of concentric annular lips projecting from a surface of said joint member, each lip having a forward extremity, the lips being inclined towards each other so that their forward extremities are closer together than their bases; means for attaching the two members to be joined and for forcing the two members together so as to deflect the lips closer together by abutting contact of the forward extremities of said lips of the joint member against the other member, said forward lip extremities being close enough together when deflected to be able to pinch the abutted surface of the other member between them so as to form a seal between the joint member and the other member; and said joint member having a generally flat surface thereon with an annular depression therein leaving remaining shoulder portions thereof, and said annular lips projecting from the base of said depression, extending above said shoulder portions, whereby at least one of said remaining shoulder portions of the generally flat surface acts as stop means to limit the movement of the lips towards said other member and towards each other as the two members are forced together.

6. An electrical connector member adapted for use with mating connector structure and which is also adapted for attachment to a stationary member, said connector member comprising an outer shell having an annular surface thereon, said surface having a pair of concentric annular lips projecting therefrom, each lip having a forward extremity, the two annular lips being inclined towards each other so that their forward extremities are closer together than the bases thereof; means for attaching the connector member to said stationary member and for forcing the two members together so that said lips are forced against said stationary member to effect a seal between said shell and said stationary member; said seal being formed by the forward extremities of said lips being deflected closer together when forced against the stationary member wherein said lip extremities are close enough together when so deflected to be able to pinch the contacted surface of the stationary member between them; and an insulation body positioned within said shell and containing at least one longitudinal bore, said bore containing an electrical contact terminal adapted at one end for connection to an electrical conductor and adapted at the opposite end for making contact with a mating contact terminal when interengaged therewith; said insulation body being in sealing engagement with said shell and said contact terminal being in sealing engagement with the walls of its bore.

7. The connector member of claim 6 in which the annular lips are resilient.

8. The connector member of claim 6 in which at least the forward extremities of the lips are of a harder material than that of the opposing surface of the stationary member.

9. The connector member of claim 8 in which the outer edges of the lips are sharp.

10. The connector member of claim 6 in which the lips are inclined towards each other so as to subtend an angle between them of from sixty to one hundred twenty degrees.

11. The connector member of claim 6 which includes stop means for limiting movement of the lips towards the stationary member and towards each other as the two members are forced together.

12. An electrical connector member adapted for use with a mating connector member and also adapted for attachment to a wall which comprises a shell member having an annular flange surrounding the shell member and having a threaded portion, the face of said flange nearest the threaded portion having a pair of concentric annular lips projecting therefrom, each lip having a forward extremity, the annular lips being inclined towards each other so that their forward extremities are closer together than their bases, and a nut engaging the threaded portion of the connector member, whereby the connector member may be attached to a wall having a suitable orifice with the nut and flange on opposite sides of the wall, and the seal formed by tightening the nut so as to move the flange toward the wall and force the forward extremities of the lips against the wall so as to deflect the lips closer together, said forward lip extremities being close enough together when so deflected to be able to pinch the contacted surface of the wall between them.

13. The connector member of claim 12 which includes stop means on said flange to limit movement of the lips toward the wall and towards each other.

14. The connector member of claim 13 in which said face of the flange has an annular depression leaving two remaining shoulder portions and the lips project from the bottom of said depression, whereby at least one of the remaining shoulder portions of the face acts as stop means to limit movement of the lips towards the wall.

References Cited by the Examiner

UNITED STATES PATENTS

| | | | |
|---|---|---|---|
| 881,060 | 3/08 | Cook. | |
| 1,786,369 | 12/30 | Terrell et al. | 339—95 |
| 2,202,492 | 5/40 | Jacocks. | |
| 2,434,475 | 1/48 | Sullivan | 339—95 |
| 2,552,686 | 5/51 | Melcher | 339—130 X |
| 2,704,357 | 3/55 | Johnson | 339—126 X |
| 3,002,173 | 9/61 | Allen | 339—95 |

JOSEPH D. SEERS, *Primary Examiner.*